United States Patent [19]

Holcombe et al.

[11] 4,261,753
[45] Apr. 14, 1981

[54] LANTHANUM-HEXABORIDE CARBON COMPOSITION FOR USE IN CORROSIVE HYDROGEN-FLUORINE ENVIRONMENTS

[75] Inventors: Cressie E. Holcombe, Knoxville; Louis Kovach, Oak Ridge; Albert J. Taylor, Ten Mile, all of Tenn.

[73] Assignee: The United States of America as represented by the United States Department of Energy, Washington, D.C.

[21] Appl. No.: 114,446

[22] Filed: Jan. 22, 1980

[51] Int. Cl.³ .................... C04B 35/52; C04B 35/50
[52] U.S. Cl. .................................. 106/56; 106/73.1; 106/73.2
[58] Field of Search .................... 106/56, 73.1, 73.2

[56] References Cited

U.S. PATENT DOCUMENTS 3,206,279  9/1965  Carnall .................... 106/73.1

FOREIGN PATENT DOCUMENTS 54-122301  9/1979  Japan .................... 106/56

*Primary Examiner*—James Poer
*Attorney, Agent, or Firm*—Earl L. Larcher; Stephen D. Hamel; James E. Denny

[57] ABSTRACT

The present invention relates to a structural composition useful in corrosive hydrogen-fluorine environments at temperatures in excess of 1400° K. The composition is formed of a isostatically pressed and sintered or a hot-pressed mixture of lanthanum hexaboride particles and about 10–30 vol. % carbon. The lanthanum-hexaboride reacts with the high-temperature fluorine-containing bases to form an adherent layer of corrosion-inhibiting lanthanum trifluoride on exposed surfaces of the composition. The carbon in the composite significantly strengthens the composite, enhances thermal shock resistance, and significantly facilitates the machining of the composition.

3 Claims, 1 Drawing Figure

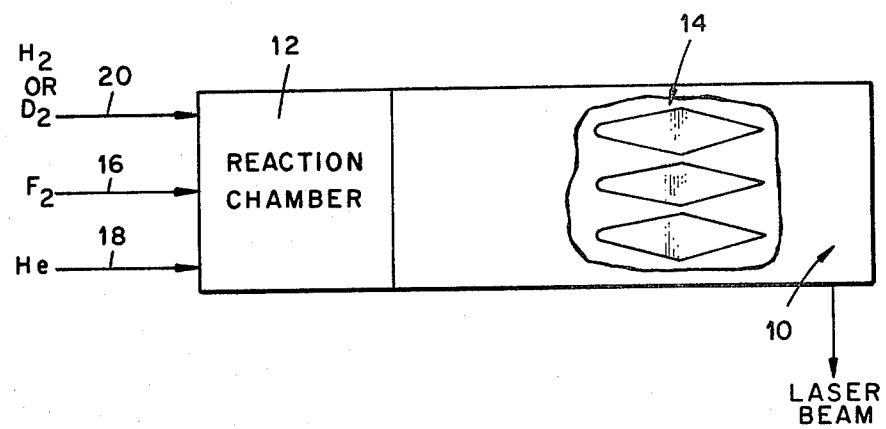

LANTHANUM-HEXABORIDE CARBON COMPOSITION FOR USE IN CORROSIVE HYDROGEN-FLUORINE ENVIRONMENTS

This invention was made as a result of a contract with the U.S. Department of Energy.

BACKGROUND OF THE INVENTION

The present invention relates generally to gas lasers, and more particularly to a composition for structural applications in a gas laser system using hydrogen fluoride as the lasing medium.

Improvements in lasers have been significant and include gas laser systems which are capable of providing extremely high-power radiation outputs. In the operation of a gas laser a chemical reaction is initiated between the molecules of an exciting gas and the vibrationally excitable molecules of a second gas to generate coherent electromagnetic radiation in the optical frequency range. This coherent radiation emission is effected by the population inversion established between upper and lower energy levels of the gaseous lasing mediums. The gas lasing system is rendered functional by coupling the excited molecules out of the reaction chamber or oscillating cavity to a point of use. In a gas laser this coupling can be effected by rapidly expanding the vibrationally excited gas or gas mixture through two-dimensional, i.e., converging-diverging nozzles. By freely expanding the vibrationally excited gas through the nozzles the flow of the excited gases entering the nozzle is sequentially compressed, attains sonic velocity near the nozzle throat and then freely expands to supersonic velocities downstream of the throat to produce the lasing action.

In a hydrogen-fluoride laser the lasing action is achieved by vibrating hydrogen-fluoride molecules to a highly excited state by an exothermic chemical reaction between the hydrogen or deuterium and fluorine in the presence of helium. These excited gases like the prior art gases are directed out of the reaction chamber through a converging-diverging nozzle to attain the supersonic velocities necessary to provide the lasing action. The lasing action provided by the hydrogen-fluoride molecules is particularly desirable because the content radiation wavelength has a low absorptivity by water molecules so that the laser beam would be minimally affected by atmospheric moisture.

While hydrogen-fluoride lasers are advantageous for the above reasons, a major problem with such lasers has been due to the lack of a structural material capable of withstanding the highly corrosive fluorine-containing gaseous environments especially at elevated temperatures. Another problem is due to the extensive thermal shock and stress encountered by the laser nozzles. At surface temperatures greater than about 1300° K. the various known structural materials proved to be ineffective for use in hydrogen-fluoride lasing systems. For example, in the prior art nickel had been utilized as the principal material for the construction of hydrogen-fluoride laser nozzles. A layer of nickel fluoride is formed on the nozzle surface when exposed to the fluorine-containing gases. This nickel fluoride layer is relatively passive in the fluorine environments at surface temperatures less than about 1300° K. but rapidly sublimes at greater temperatures with this rate of attack upon the nickel increasing with increasing temperatures. Accordingly, the nickel-metal nozzles can be protected from corrosion by maintaining the nozzle surface temperatures at less than 1300° K. with an internal coolant arrangement. While cooling the nozzle effectively protects the nozzle, the efficiency of the laser is significantly decreased since a large amount of the laser energy is transferred to the coolant so as to significantly decrease the number of molecules in the excited state.

Previous work also included the fabrication of simulated nozzles from lanthanum hexaboride (LaB$_6$) for testing in a hydrogen-fluoride flame. The lanthanum-hexaboride composition becomes coated with an adherent layer of lanthanum-trifluoride (LaF$_3$) when contacted by the flame at elevated temperatures. Corrosion of the lanthanum hexaboride by the fluorine-containing hydrogen fluoride gas (typically 2HF, F$_2$) at surface temperatures greater than 1300° K. and up to about 1800° K. were essentially obviated by this layer of lanthanum trifluoride. While this nozzle-forming composition provides a significant improvement over the materials of the prior art as a nozzle constructing material for hydrogen-fluoride lasers, complete success was not achieved with lanthanum hexaboride since it is extremely brittle and very difficult to machine. Further, due to the relatively poor thermal shock resistance a hydrogen-fluoride simulated laser nozzle formed from lanthanum hexaboride underwent deleterious stressing and cracking during the operation at surface temperatures greater than about 1400° K. Thus, because of the difficulty in machining lanthanum hexaboride and its relatively poor thermal shock resistance, flexibility in the design of laser nozzles, and other laser hardware requiring the material is very limited.

SUMMARY OF THE INVENTION

It is the primary aim or goal of the present invention to provide a composition for use as a structural material in the fabrication of hardware contactable with high temperature fluorine-containing gases. The composition of the present invention consists essentially of a carbon phase uniformly dispersed in a continuous phase of lanthanum hexaboride with the carbon providing about 10 to 30 volume percent (vol.%) of the composition. A portion of this carbon may consist of discontinuous carbon fibers for increasing the strength of the composite.

The composition of the present invention is particularly adaptable for use in gas lasing operations in which the lasing medium consists primarily of hydrogen fluoride. The subject composition is suitable for constructing nozzles, combustion chambers and the like using gas-laser systems in which the high temperature fluorine and hydrogen fluoride comes into contact therewith. The composition can be machined into the desired hardware configuration substantially easier than lanthanum hexaboride without the addition of the carbon. The composition is highly resistant to thermal shock and is relatively stable under the attack by the corrosive fluorine and/or hydrogen fluoride at temperatures up to a maximum use-temperature of about 1800° K.

Other and further objects of the invention will be obvious upon an understanding of the illustrative composition about to be described or will be indicated in the appended claims, and various advantages not referred to herein will occur to one skilled in the art upon employment of the invention in practice. While the term carbon is used in the specification to describe the matrix material, it is to be understood that this term is to be equally applicable to graphite in the event the matrix is graphitized during the preparation thereof. Further, while the discontinuous fibers employed in the composition are preferably graphite fibers, it will appear clear that carbon fibers or carbon fiber precursors can be utilized and then subsequently carbonized and/or graphitized.

DESCRIPTION OF THE DRAWING

In the drawing the FIGURE is a schematic representation of a hydrogen-fluoride laser system in which the composition of the present invention may be utilized for constructing the laser hardware exposed to the high temperature fluorine-containing gases.

An embodiment of the invention has been chosen for the purpose of illustration and description. The embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

A hydrogen-fluoride chemical laser functions through the use of high-temperature hydrogen-fluoride molecules which have been chemically excited to a highly elevated vibrational state and rapidly expanded through a supersonic nozzle to form the coherent stimulated emission of light energy. As generally shown in the accompanying drawing, the gas laser generally shown at 10 is provided with a reaction chamber or zone 12 and a bank of supersonic nozzles 14. Fluorine gas is introduced into the reaction chamber 12 together with an inert gas, such as helium, through conduits 16 and 18 respectively. Either hydrogen or deuterium is introduced into the reaction chamber 12 through conduit 20. The fluorine exothermically reacts with the hydrogen or deuterium in the reaction chamber at approximately ambient pressure, and a gas temperature in the range of about 1650° to 2850° K. results (depending on the amount of helium diluent. The molecules of hydrogen fluoride are vibrationally excited and flow into an optical laser cavity through an array of two-dimensional nozzles 14. The rapid expansion and acceleration of the excited molecules through the nozzles 14 creates the lasing action. The particular configuration of the nozzles 14 or other components of the laser 10 does not form the basis of the present invention since this invention is directed to the material from which such hardware or structural components may be constructed.

A hydrogen-fluoride laser having a nozzle system capable of withstanding fluorine-containing gases at high temperatures in the range of about 1400°–1700° K. achieves a desirable level of operating efficiency. The objective of the present invention, as pointed out above, is to provide a material from which the nozzles and other structural components of such a laser may be constructed with this material withstanding the high temperatures, thermal stress and shock conditions and the ablation and corrosion caused by the hot fluorine-containing gases. The composition of this material comprises essentially lanthanum hexaboride with 10–30 vol.% carbon. The lanthanum hexaboride used in the composition is a powder with a particle size in the range of about 5 to 44 $\mu$m and a purity greater than 99%. The lanthanum hexaboride is admixed with a sufficient quantity of a liquid carbonizable precursor having a sufficient carbon yield to provide the desired concentration of carbon in the finished composite. The mixture of the lanthanum-hexaboride particles coated with the liquid carbon precursor may be isostatically pressed at a pressure in the range of about 1000 to 3000 psi, then polymerizing or curing the resin at a temperature of 100° to 300° C. for a duration of 15 minutes to 48 hours; an argon atmosphere is typically used for this curing process. The pressed compact is then sintered in an atmosphere of argon at a temperature sufficient to bond the carbon and $LaB_6$ phases which is in the range of about 2100° to 2300° C. Alternatively, the aforementioned mixture of the lanthanum-hexaboride powder and the carbon precursor may be hot-pressed at a temperature in the range of about 2000° to 2100° C. and at a pressure in the range of about 2000 to 4000.

Thermosetting carbon precursors suitable for use in preparing the composition of the present invention include epoxy resin, phenolic resin, and other thermosetting carbonaceous materials.

The particles of lanthanum hexaboride are coated and in effect encapsulated within the carbon precursor prior to the carbonization and densification steps so as to provide a highly uniform distribution of the carbon phase within the lanthanum-hexaboride matrix or continuous phase. Observations of the composite show that the carbon is dispersed into the lanthanum-hexaboride matrix during the sintering operation. The composite whether hot pressed or isostatically pressed and then sintered is at a density that is preferably $\geq$90% of theoretical. Minimal porosity (such as the range of 0 to 15%) is desired to provide optimum corrosion resistance in the fluorine environment. The resulting carbon phase substantially increases the strength of the composite, the resistance to thermal shock and significantly facilitates the machining as well as providing an increased capability of maintaining structural integrity in the corrosive fluorine-containing environment.

With a lanthanum-hexaboride and carbon or graphite ($LaB_6$-C) composite being exposed to a high-temperature hydrogen fluoride gas a protective lanthanum-trifluoride ($LaF_3$) coating forms on the boride particles by a reaction between the lanthanum and the fluorine. If a sufficiently small quantity of carbon is present this lanthanum-trifluoride coating is expected to protect the entire composite from corrosion by the fluorine-containing gases.

The concentration of the carbon in the composite is within the range of about 10–30 vol.%. With a composite having greater than 30 vol.% carbon, the lanthanum-trifluoride coating formed on the surface was not sufficiently adherent and cracked and spalled when exposed to the hydrogen fluoride flame so as to be undesirable in a high-temperature fluorine-rich environment. The concentration of the carbon should be greater than 10% in order to assure the formation of a uniform distribution of the carbon in the lanthanum-hexaboride matrix. Without the presence of this carbon phase increased machining difficulty and deleterious thermal shock problems occur. The uniform distribution of the carbon also provides effective crack blunting.

Discontinuous graphite or carbon fibers with a nominal length of 0.25 mm may be employed to form up to the total carbon content in the composite. The fibers provide an overall increase in the strength of the composite as well as an increase in its resistance to thermal shock.

Samples heated to 2300° C. which is near the melting point of 2715° C. of lanthanum hexaboride dissolved the carbon and precipitated it as large graphite crystallites upon cooling. No evidence of carbide formation was present which minimized the possibility of water reactivity with the composites. Such activity would be present if any significant carbide was in the composite.

In order to provide a more facile understanding of the present invention several examples relating to the lanthanum-hexaboride carbon composite of the present invention are set forth below.

EXAMPLE 1

A solid cylinder of the material of the present invention was fabricated from a homogeneous mixture of lanthanum-hexaboride particles and a thermal setting phenolic resin having a carbon yield of about 53 vol.%. The cylinder was formed with a diameter of 1 inch and a height of 0.5 inch and contained approximately 74.5 vol.% lanthanum hexaboride and 25.5 vol.% carbon. The cylinder was prepared by coating the lanthanum-hexaboride particulates of an average particle size less than 25 micrometers with the phenolic resin. The mixture was blended and isostatically pressed at 150° C. for polymerizing the resin under an argon pressure if 2500 psi. Following this pressing operation which lasted for a duration of 15 minutes, the compact was sintered in argon at 2100° C. for 1 hour during which the precursor was converted to carbon. No interaction of the lanthanum hexaboride and carbon below 2100° C. was noted by metallography of the specimen. The composite was 89% of theoretical density and had a porosity of 11 percent. The composite was subjected to a hydrogen-fluorine flame at 1700° K. for a duration of 2.5 minutes and 1830° K. for 4 minutes. During this 6.5 minute duration, the surface temperature of the composite attained a temperature of approximately 1478° K. A weight loss of 0.62% was noticed during this exposure to the flame. However, no change in diameter and height of the cylinder occurred. During this run a lanthanum-trifluoride layer was formed on the crystal. This coating of a thickness of about 6 mils was white and very adherent to the cylinder. The failure temperature (1870° C.) of the lanthanum hexaboride-carbon composite is approximately the same as the failure temperature (1875° K.) of theoretically dense lanthanum hexaboride, and then has approximately the same upper-use-temperature (1800° K.).

EXAMPLE 2

A second composite in the form of a cylinder as in Example 1 was prepared so as to contain 15.5 vol.% carbon and after sintering had an essentially 0 porosity. This composite when subjected to a hydrogen-fluorine flame for approximately the same duration and temperature as the cylinder in Example 1 showed a surface temperature of 1467° K. with a weight loss of 0.37%. Again, as in Example 1, no change was detected in the diameter or height of the cylinder. The inspection of the specimen illustrated that it was gray on the top where exposed to the flame and whitish on the sides. Some reacted area was present on the bottom. The top coating was hard and approximately 6 mils thick. This coating was formed of lanthanum trifluoride and was very adherent to the composite.

EXAMPLE 3

A lanthanum-hexaboride composite containing 10 vol.% carbon was hot pressed at 4060 psi and a temperature of about 2100° C. for a duration of 20 minutes. This composite was tested under the hydrogen-fluoride flame to maximum temperatures from 1580°–1610° K. Weight loss and dimensional changes were relatively negligable. The composite appeared to be black on top and white elsewhere with the total top surface coating thickness being approximately 10 mils. The coating of lanthanum trifluoride was hard and adherent.

EXAMPLE 4

A composite containing 6.0 vol.% carbon formed by the thermal-setting resin and 9.8 vol.% chopped graphite fibers was formed by hot pressing the mixture at 3200 psi and about 2100° C. for a duration of 20 minutes. A first run with this composite at a surface temperature of 1545° K. in a hydrogen-fluoride flame provided a hard whitish coating of approximately 10 mils thick on the top surface with negligible weight loss and dimensional changes. In a rerun of this composite in the hydrogen-fluoride flame a maximum surface temperature of 1570° K. was attained. The thickness of the top coating remained at approximately 10 mils with the weight loss during the second run being 0.6%.

It will be seen that the present invention provides a composition which is particularly useful in the high-temperature fluorine-containing environments encountered in hydrogen-fluoride laser systems. By employing the composition of the present invention in such laser systems the operating range may be increased to a temperature in the range of about 1400°–1700° K. so as to considerably increase the efficiency of the hydrogen-fluoride laser. Further, while the composition is primarily directed to its use in a hydrogen-fluoride laser, it will appear clear that a torch using the hydrogen-fluorine-helium flame could have various applications such as in the cutting of metals, ceramics and the like.

What is claimed is:

1. A composition for use as a structural material in a high-temperature gaseous fluorine-containing environment, said composition consisting essentially of a carbon phase dispersed in lanthanum-hexaboride matrix with said carbon phase providing about 10–30 vol.% of the composition, said composition being characterized by being essentially resistant to thermal shock and fluorine corrosion at material surface temperatures greater than 1400° K.

2. The composition claimed as in claim 1 wherein discontinuous carbon fibers provide up to 30 vol.% of the composition.

3. A supersonic expansion nozzle for a hydrogen-fluoride laser system formed of the composition claimed in claim 1.

* * * * *